United States Patent [19]

Kanaan et al.

[11] Patent Number: 5,511,801
[45] Date of Patent: Apr. 30, 1996

[54] INTEGRATED COLLET AND CHUCK DEVICE

[75] Inventors: Roger J. Kanaan, Easley; Edward H. Martin, Anderson, both of S.C.

[73] Assignee: Power Tool Holders, Inc., Wilmington, Del.

[21] Appl. No.: 221,889

[22] Filed: Apr. 1, 1994

[51] Int. Cl.$^6$ .................................................... B23B 31/20
[52] U.S. Cl. ............................................. 279/52; 279/46.7
[58] Field of Search ............................... 279/46.7, 51–53, 279/58–61, 64, 83

[56] References Cited

U.S. PATENT DOCUMENTS

| | | |
|---|---|---|
| 93,108 | 7/1869 | Miller . |
| 549,837 | 11/1895 | Weir ............................................. 279/61 |
| 913,059 | 2/1909 | Savage . |
| 914,255 | 3/1909 | Farnham . |
| 1,042,507 | 10/1912 | Van Ness . |
| 1,043,114 | 11/1912 | Kupke . |
| 1,509,061 | 9/1924 | Hardwicke . |
| 1,602,708 | 10/1926 | Russell . |
| 1,705,275 | 3/1929 | Von Neudeck . |
| 1,958,817 | 5/1934 | Gase ............................................. 279/83 |
| 2,172,070 | 9/1939 | Palmgren . |
| 2,346,706 | 4/1944 | Stoner . |
| 2,413,422 | 12/1946 | Teige et al. . |
| 2,553,990 | 5/1951 | Vidal . |
| 2,613,941 | 10/1952 | Gridley . |
| 2,615,721 | 10/1952 | Gridley . |
| 2,619,357 | 11/1952 | Montgomery . |
| 2,880,007 | 3/1959 | Stoner ......................................... 279/46.7 |
| 3,462,164 | 8/1969 | Wightman . |
| 3,599,996 | 8/1971 | Holt . |
| 3,702,705 | 11/1972 | Schadlich . |
| 3,861,693 | 1/1975 | Huber ........................................... 279/61 |
| 3,893,677 | 7/1975 | Smith . |
| 3,947,047 | 3/1976 | Hultman . |
| 4,032,163 | 6/1977 | Holt . |
| 4,083,571 | 4/1978 | Schadlich . |
| 4,184,692 | 1/1980 | Benson et al. . |
| 4,230,327 | 10/1980 | Rohm . |
| 4,234,277 | 11/1980 | Benson et al. . |
| 4,252,333 | 2/1981 | Vogel . |
| 4,266,789 | 5/1981 | Wahl et al. . |
| 4,275,893 | 6/1981 | Bilanceri . |
| 4,305,597 | 12/1981 | McCarty . |
| 4,395,051 | 7/1983 | Tonomura . |
| 4,463,960 | 8/1984 | Walton . |
| 4,527,809 | 7/1985 | Umbert . |
| 4,563,013 | 1/1986 | Hunger et al. . |
| 4,648,608 | 3/1987 | Smith . |
| 4,655,464 | 4/1987 | Manschitz et al. . |
| 4,695,065 | 9/1987 | Komatsu et al. . |
| 4,711,457 | 12/1987 | Wezel . |
| 4,848,779 | 7/1989 | Wheeler et al. . |
| 4,902,025 | 2/1990 | Zimdars . |
| 4,991,859 | 2/1991 | Rohm . |
| 5,009,440 | 4/1991 | Manschitz . |
| 5,031,925 | 7/1991 | Tatsu et al. . |
| 5,301,961 | 4/1994 | Wozar . |

*Primary Examiner*—Steven C. Bishop
*Attorney, Agent, or Firm*—Dority & Manning

[57] ABSTRACT

An integrated and collet and chuck device includes a body member configured to be non-movably fixed to a drive spindle of a driving tool. An outer sleeve member is disposed about a portion of the body member and is rotatable relative to the body member. The sleeve member comprises a front end defining a collet receiving chamber for carrying a conventional collet. A nut is configured with the sleeve member so as to be rotatable therewith relative to the body member. A screw member is disposed rotatably concentric within the nut. The screw and nut are threadedly engaged so that rotation of the nut drives the screw member in the longitudinal direction. The screw member has a collet engaging surface which presses the collet within the frusto-conical inner diameter surface of the sleeve thereby causing the collet to collapse and grip upon the shank of a tool carried therein.

21 Claims, 6 Drawing Sheets

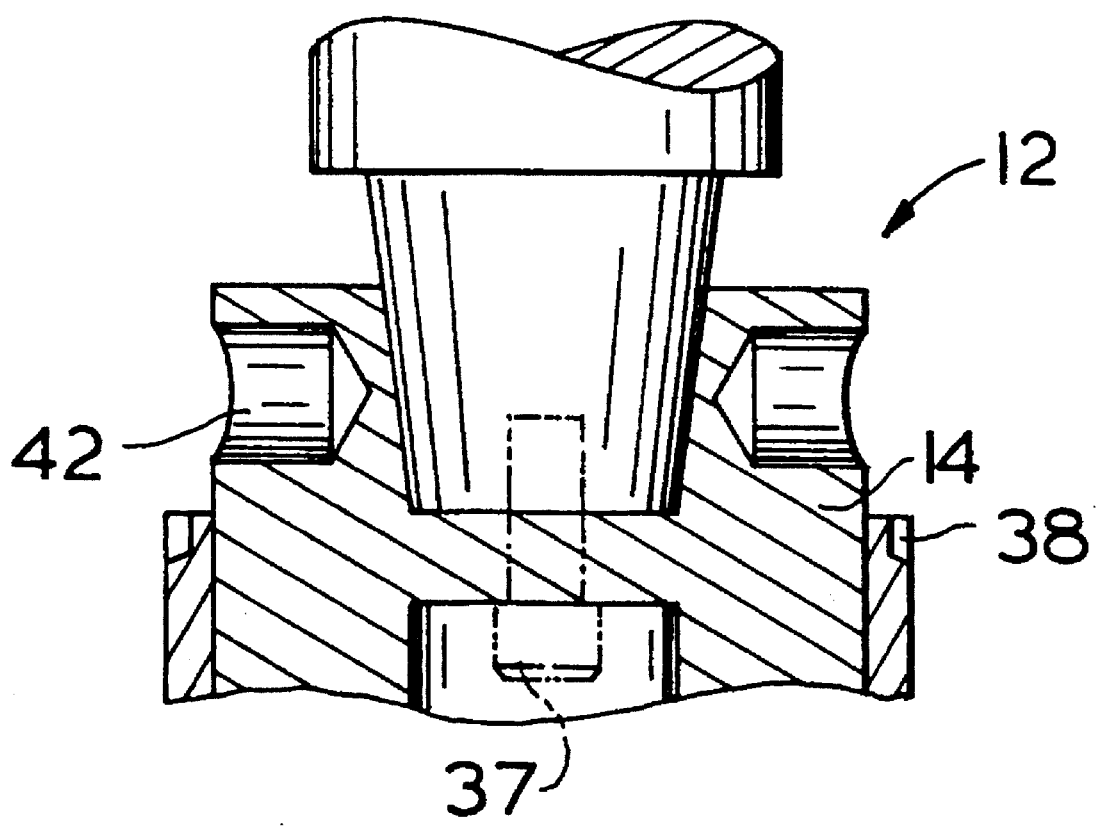
FIG.IA

INTEGRATED COLLET AND CHUCK DEVICE

BACKGROUND OF THE INVENTION

The present invention relates to a device utilized for holding a machine tool collet and causing the collet to clamp about a tool shaft disposed therethrough, and more particularly to an integrated collet and chuck device particularly useful on high speed devices such as routers.

Present conventional systems used on portable stationary routers, laminate trimmers, or dry wall cutters utilize a collet tool holding device having a tapered collet that conforms to the hollow cone of the collet chuck or router motor shaft. Typically, a threaded nut is provided having a conical cam surface which matches the conical surface of the outer collet face. With these typical devices, when a tool is inserted within the collet, the nut is tightened forcing the collet to collapse and grip the tool carried therein. During this operation, however, the drive spindle or chuck of the machine tool has to be held stationary in order to tighten the nut sufficiently. For this reason, most router chucks, for example, have spindle locks or are provided with an extra wrench that fits the chuck body or shaft. Similarly, to release the tool, the machine shaft or chuck body must be held stationary while the nut is loosened in the counter clockwise direction. This procedure has proven to be cumbersome and requires a means, such as a separate wrench, for locking the spindle shaft. Also, with the conventional systems the operator must physically tightened the nut onto the collet in very tight or close proximity to the sharp cutting edges of the bit or tool carried by the collet. Thus, the operator is subjected to unnecessary risk and injury.

OBJECTS AND SUMMARY OF THE INVENTION

It is a principle object of the present invention to provide an improved apparatus and device for securing a bit or working device to the driven spindle of a machine tool.

A further object of the invention is to provide an integrated collet and chuck device which eliminates the necessity of locking the machine tool shaft or spindle in order to grasp a tool held by the collet.

And yet a further object of the present invention is to provide an integrated collet and chuck device wherein collets can be readily replaced or exchanged.

Another object of the present invention is to provide a collet and chuck device which is mateable with any manner of driven spindle, particularly routers, laminate trimmers, and the like.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, an integrated collet and chuck device is provided. The device includes a body member which is configured to be non-movably fixed to a drive spindle of a driving tool. Preferably, the body member includes a threaded hole for being threadedly engaged with the drive spindle of a tool. The device includes an outer sleeve member disposed concentric about at least a portion of the body member. The sleeve member is rotatable relative to the body member and includes a front end having a frusto-conical inner diameter surface for carrying a machine tool collet therein. A nut is configured within the sleeve member so as to be rotatable with the sleeve relative to the body member. The nut comprises an inner diameter engaging surface. A screw member is disposed rotatably concentric within the nut. The screw member comprises an outer diameter engaging surface which complements the inner diameter engaging surface of the nut. The screw member is movable longitudinally relative to the nut through driving engagement of the nut inner diameter engaging surface and screw member outer diameter engaging surface. The screw member further includes a front face defining a collet engaging surface. A collet is carried within the front end of the sleeve member. The collet comprises a frusto-conical outer diameter surface complimenting the inner diameter surface of the sleeve member. The collet is in engaging contact with the collect engaging surface of the screw member so as to move longitudinally therewith relative to the nut. In this manner, upon rotation of the sleeve member relative to the body member, the nut is driven towards the front end of the sleeve member progressively forcing the collet frusto-conical outer diameter surface against the sleeve member frusto-conical inner diameter surface causing the collet to collapse and clamp about a machine tool shank carried therein.

Preferably, the sleeve member comprises teeth defined therein for engagement with a tooth turning device, such as a chuck key. In this manner, the sleeve member is rotated relative to the body member through engaging rotation of the turning device with the teeth defined in the sleeve member. In this embodiment, the body member includes a hole or recess defined therein for seating the turning device.

The configuration of the nut within the sleeve member can comprise any manner of configuration. For example, the nut may be formed integral with the sleeve member. In an alternative embodiment, a nut may be pressed fitted into the sleeve member. Likewise, the nut and sleeve may be formed as a single component. The collet of the present device preferably includes the type collet having a plurality of individual longitudinally disposed gripping jaws held in a spaced apart relation through a resilient material disposed therebetween. The jaws have an outer face defining a frusto-conical outer diameter, and an inner gripping face for clamping upon a machine tool shank carried therethrough. Alternative embodiments of a collet may also be used in present device, for example a conventional split steel type collet.

The sleeve member of the present invention comprises a rearward section and a forward section. In a preferred embodiment, the forward section is removably engaged with the rearward section. The forward section defines a collet cavity for receiving a machine tool collet. The forward section is removable from the rearward section so that the machine tool collet can be readily replaced or exchanged. In an alternative embodiment, the rearward and forward sections of the sleeve may be non-separable.

Preferably, the collet is lockingly engaged with the collet engaging surface of the screw member. This is desired so that the collet is pulled away from the frusto-conical inner diameter surface of the sleeve upon rotating the sleeve and nut in the counter clockwise or loosening direction. In this embodiment, the screw member may comprise a retaining groove defined generally near the front end thereof for engaging with a flange member of the collet.

The accompanying drawings, which are incorporated and constitute are part of the specification, illustrate embodiments of the invention and, together with the description, serve to explain the principles of the invention.

BRIEF DESCRIPTION OF THE DRAWINGS

FIG. 1a is a detail cutaway view of an alternate mode of attaching the device to a drive spindle.

DESCRIPTION OF THE PREFERRED EMBODIMENTS

Figure 1:
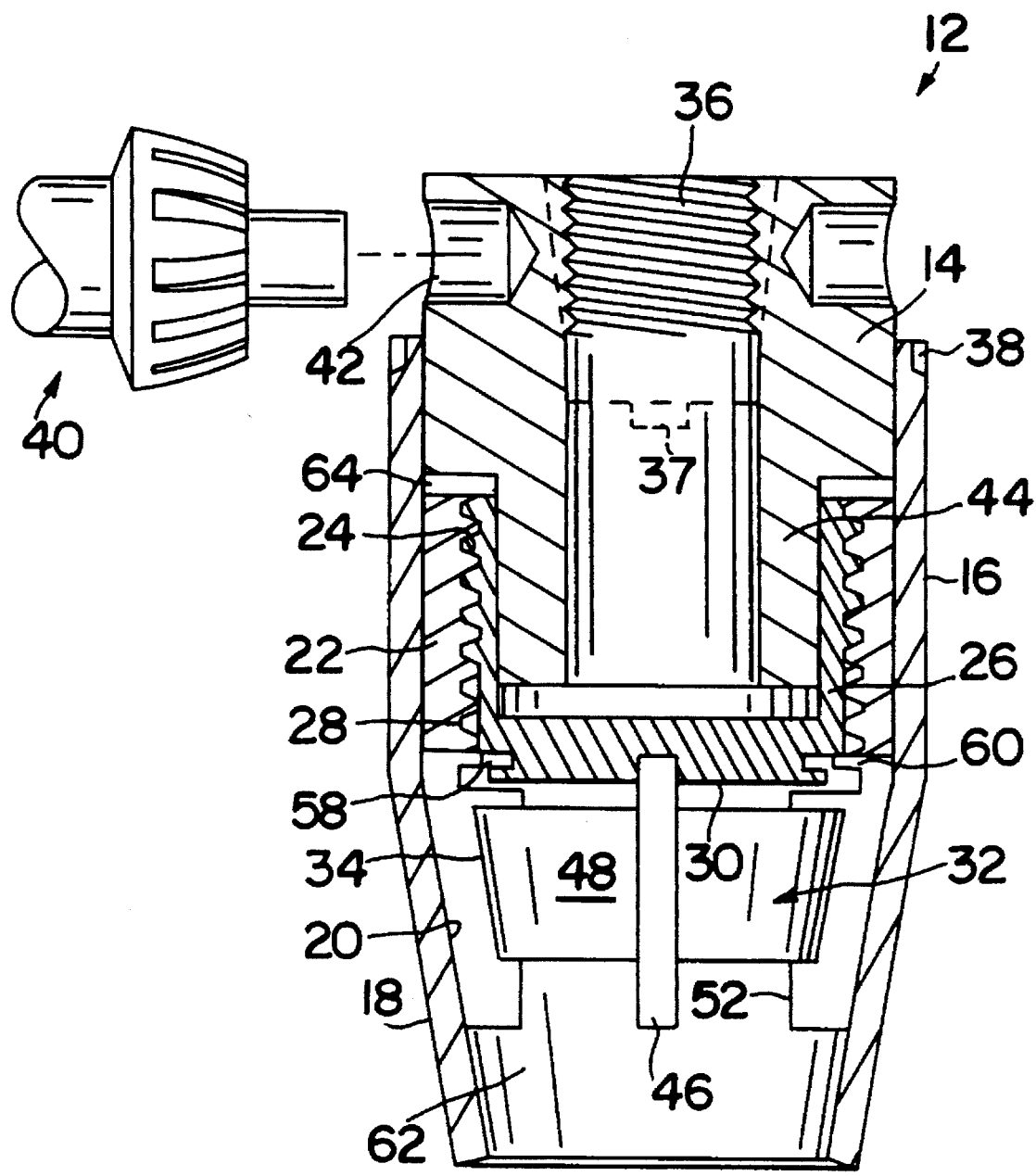
FIG. 1 is a cutaway perspective view of an embodiment of the integrated collet and chuck device according to the invention.

Reference now will be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The numbering of components in the drawings is consistent throughout the application, with the same components having the same number in each of the drawings.

An integrated collet and chuck device according to the invention is depicted in the figures generally as 12. Device 12 includes a body member 14 which is configured to be non-movably fixed to a drive spindle of a driving tool. The driving tool is not illustrated in the figures. Body member 14 may be formed of any manner of suitable material from any conventional manufacturing means. Body member 14 preferably includes a threaded hole 36 defined in the back end thereof for threaded engagement with a drive spindle of a driving tool. Hole 36 may be threaded or may comprise a tapered hole The device 12 may simply be screwed or threaded onto the drive spindle of an appropriate driving tool or, in the tapered hole embodiment, attached by a set screw 37 through the inner diameter of device 12. This feature is particularly illustrated in FIGS. 1a. Also, it is within the scope of the invention that body member 14 be attached to a drive spindle through any manner of conventional attaching means besides the threaded hole 36 illustrated. For example, a snap fit or other appropriate means or devices may be utilized.

Figure 3:
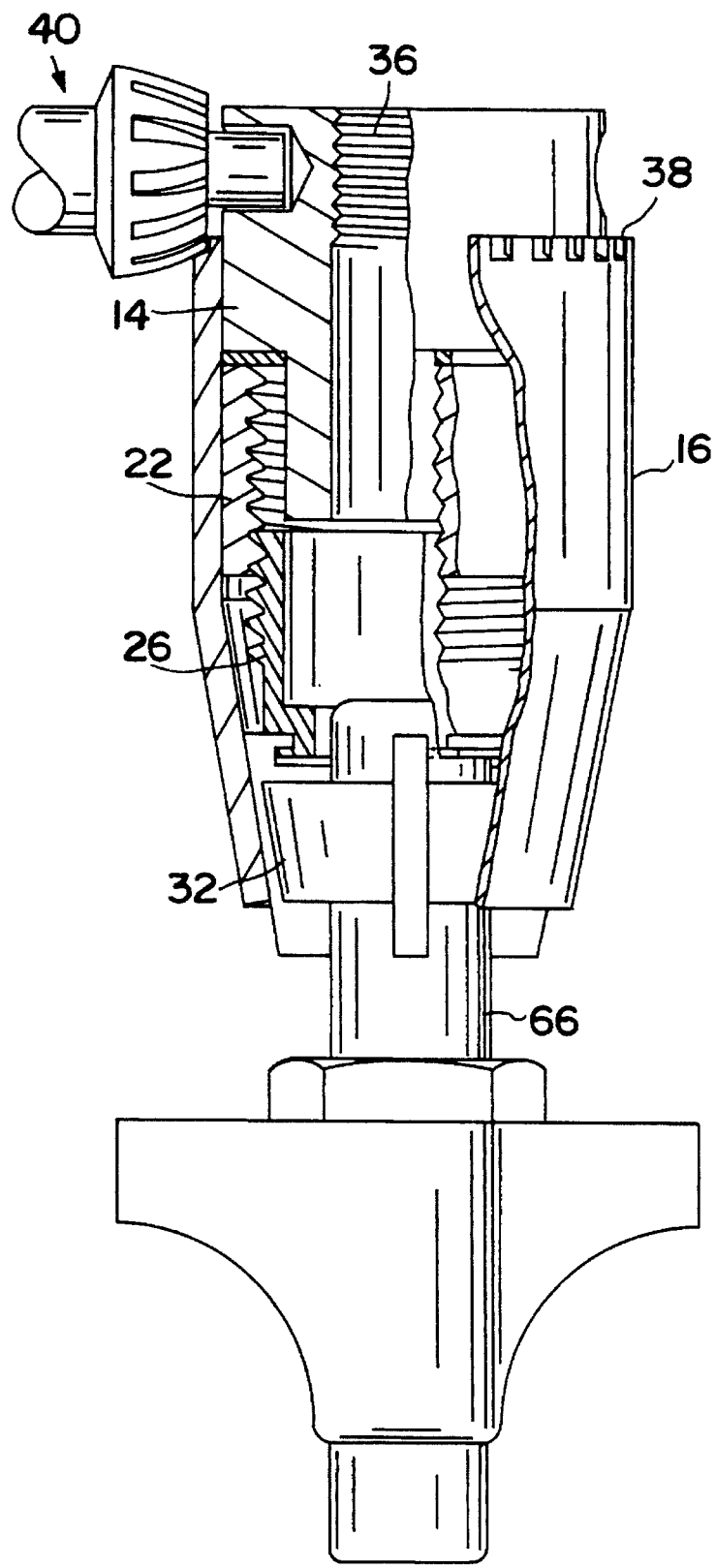
FIG. 3 is a partial cutaway perspective view of an embodiment of the invention particularly illustrating the operation of the device.
Figure 5:
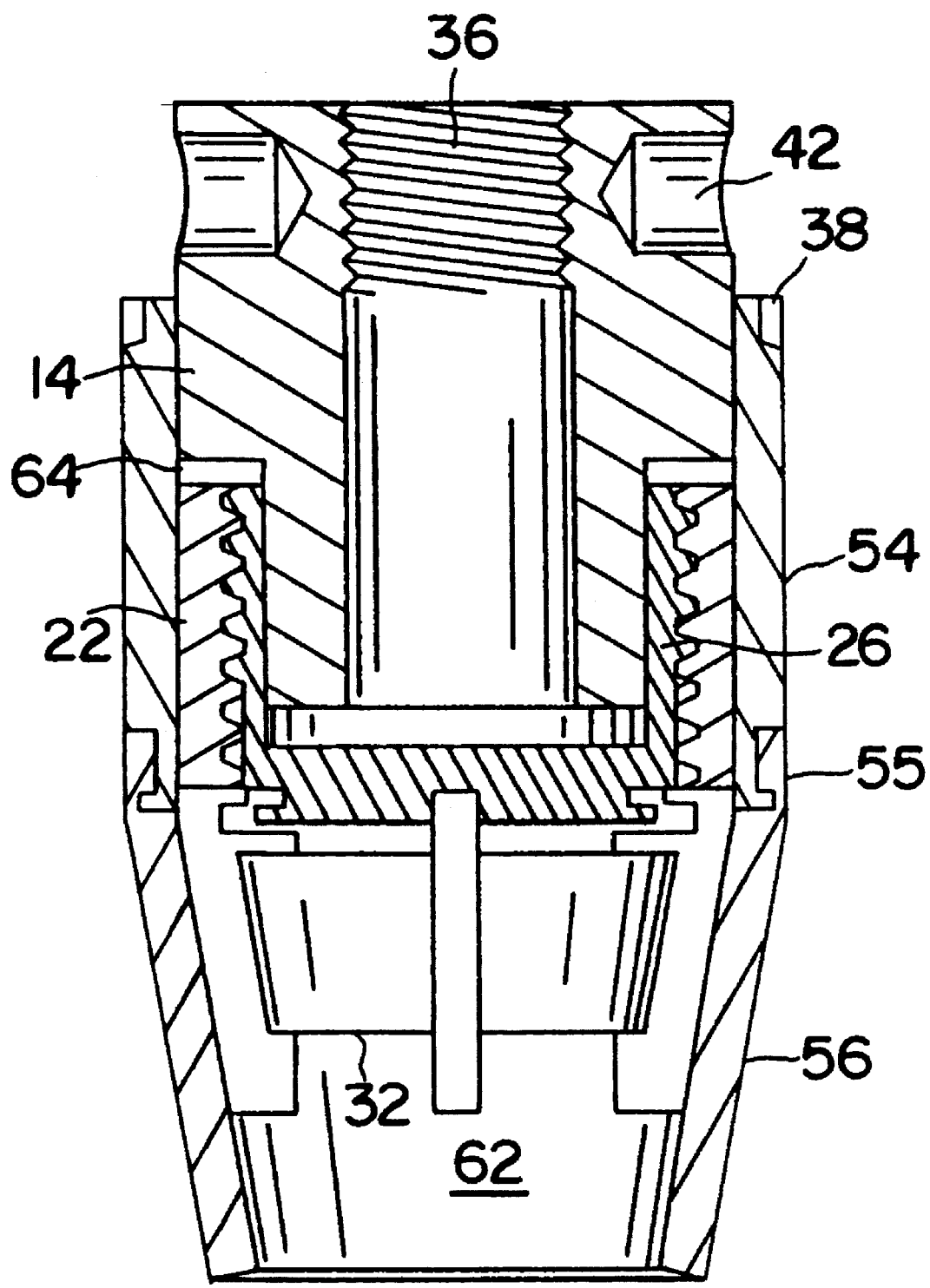
FIG. 5 is a cutaway perspective view of the device illustrated in FIG. 4.

Device 12 also includes an outer sleeve member 16 which is disposed concentric about at least a portion of body member 14. Referring to FIGS. 1, 3 and 5 in particular, it can be seen that body member 14 fits into sleeve member 16 with both members being concentric with respect to the axis of device 12. Sleeve member 16 is rotatable relative to body member 14. In other words, body member 14 is non-movably fixed to a drive spindle of a driving tool and sleeve member 16 rotates about body member 14. Sleeve member 16 comprises a front end 18 having a frusto-conical inner diameter surface 20 for carrying a machine tool collet 32. Operation of collet 32 within the front end of sleeve member 16 will be described in detail further on. Sleeve member 16 may be formed of any suitable material, for example a hard plastic resin or polymer, plastic, and the like. In addition, sleeve member 16 may also include a grip enhancing surface, such as a knurled surface, or be coated with a grip enhancing material such as rubber or the like.

Device 12 includes a nut 22 configured within sleeve member 16 so as to be rotatable therewith relative to body member 14. In the embodiments illustrated, nut 22 is a separate component from sleeve 16 and sleeve 16 is press fitted onto nut 22. In this manner, nut 22 rotates with sleeve 16 relative to body member 14. In alternative embodiments, nut 22 may be formed integral with sleeve 16 or the components may be permanently secured to each other. Alternatively, sleeve 16 may comprise a thickened portion which, in essence, constitutes nut 22. Any configuration of a sleeve and nut is within the scope of the invention. Nut 22 includes an inner diameter engaging surface, such as threaded surface 24.

A screw member 26 is rotatably disposed concentric within nut 22. In other words, screw member 26 is fitted within nut 22 which is fitted within sleeve 16. Screw member 26 comprises an outer diameter engaging surface 28 for complementing engagement with the engaging inner diameter 24 of nut 22. In a preferred embodiment, the surfaces are threadedly engaged. In this manner, screw member 26 is movable longitudinally relative to nut 22 and sleeve 16 through driving engagement of the threaded surfaces between nut 22 and the outer surface of screw member 26. In this manner, as sleeve 16 is rotated in one direction, screw member 26 is moved longitudinally in a corresponding direction through engagement of threaded surfaces 24 and 28. Likewise, when sleeve 16 is rotated in the opposite direction, screw member 26 moves longitudinally in an opposite corresponding direction.

Figure 2:
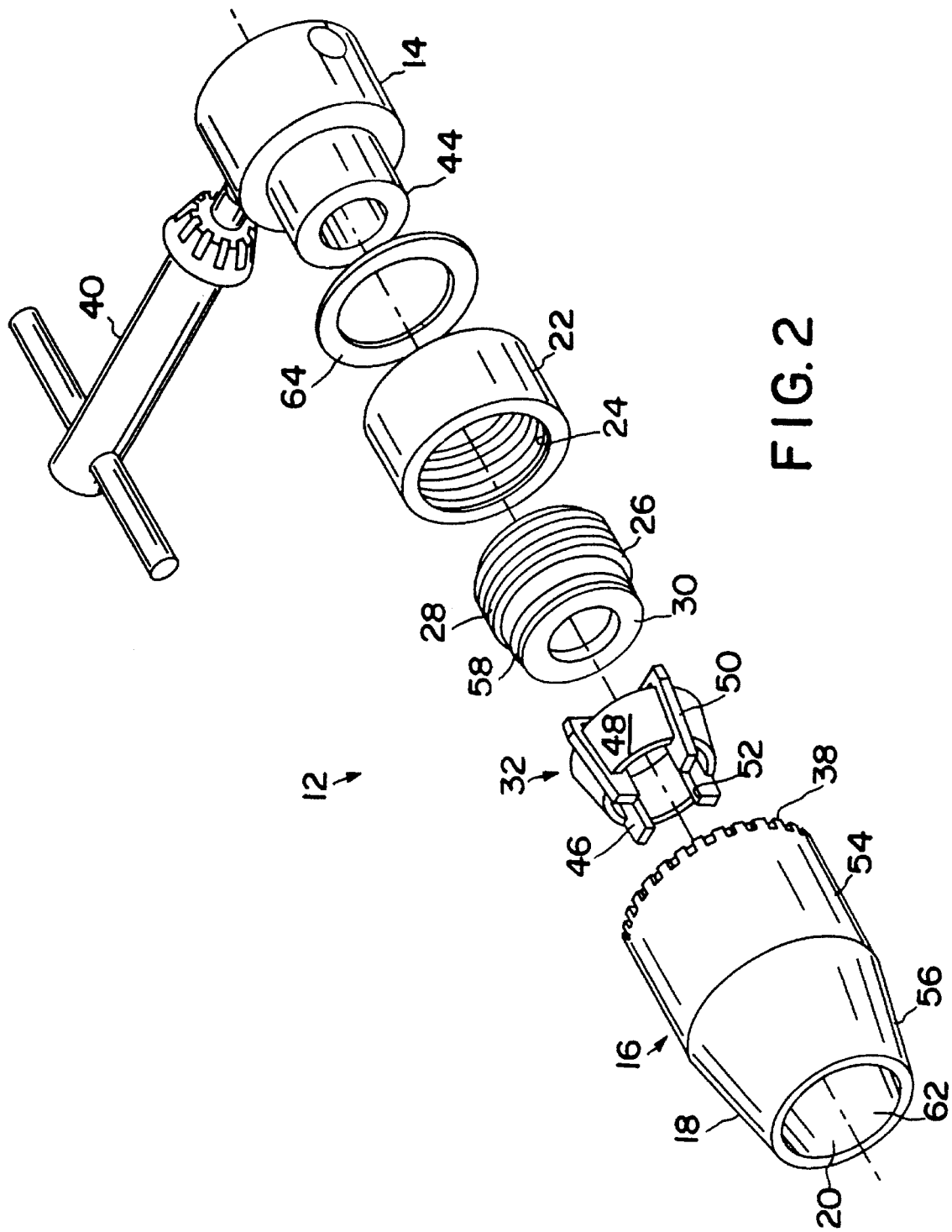
FIG. 2 is an exploded component view of the device illustrated in FIG. 1.

Preferably, screw member 26 is concentric about a stem portion 44 of body member 14. Screw member 26 further includes a collet engaging surface 30 defined at the front end thereof. The surface is particularly illustrated in FIG. 2. Surface 30 is configured for pressing against a 35 collet 32 carried within the frusto-conical front end 18 of outer sleeve member 16. In a preferred embodiment of the invention, collet engaging surface 30 includes a groove or recess 58 defined therearound. This groove is provided for engaging a flange 60 of collet 32 carried within the device so that the collet is lockingly engaged with screw member 26 so as to be moved with the screw member in both longitudinal directions. Any manner of locking members or device may be utilized between collet 32 and screw member 36 for this purpose.

Device 12 may include a collet 32 carried in the front frusto-conical end 18 of sleeve member 16. Collet 32 comprises a frusto-conical outer diameter surface 34 which compliments frusto-conical inner diameter surface 20 of sleeve 16. Collet 32 is in engaging contact with collet engaging surface 30 of screw member 26 so as to move at least in the forward direction longitudinally therewith relative to nut 22. The operation of typical collets 32 is well understood by those in the art and need not be described in great detail herein. In general though, as collet 32 is moved longitudinally forward within sleeve 16 through rotation of screw member 26, jaws 46 of the collet, which define the frusto-conical outer diameter surface of the collet, are forced against the complementing frusto-conical inner diameter surface of the sleeve causing the jaws to collapse and grip a tool shank held within the collet. Any manner or make of conventional collet may be utilized with the present invention. For example, the typical split-steel collet may be utilized. In a preferred embodiment of the invention, collet 32 comprises a plurality of individual longitudinally disposed gripping jaws 46 held in a spaced apart relation through resilient material 48 disposed therebetween. Jaws 46 have an outer face 50 defining the frusto-conical configuration of the collet. Jaws 46 include an inner gripping face 52 for clamping upon a machine tool shank carried therethrough. Operation of collet 32 gripping upon a tool shank 66 by displacement of collet 32 within sleeve 16 is particularly illustrated in FIG. 3.

In one preferred embodiment of device 12 according to the invention, collet 32 is provided with the device. In this embodiment, for example, sleeve 16 may be fixed and not readily removable from body member 14. In this embodiment, collet 32 is placed within the front end 18 of sleeve 16 during assembly of device 12. In an alternative preferred embodiment, access is provided to the front end of sleeve 16 so that collet 32 may be replaced or otherwise changed. In this embodiment, particularly illustrated in FIGS. 4 and 5, sleeve 16 comprises a forward section 56 and a rearward section 54. A latching device 55 is provided so that the two sections can be mated. Applicant has found that a conventional bayonet type fastener or latch 55 may be utilized. Any manner of conventional latches or securing devices may be utilized. For example, forward section 56 may be threaded onto rearward section 54. In this manner, it should be understood that access is readily provided to a collet receiving chamber 62 defined by front end 18 of sleeve 16. Collet 32 may be readily exchanged or replaced from device 12.

Figure 4:
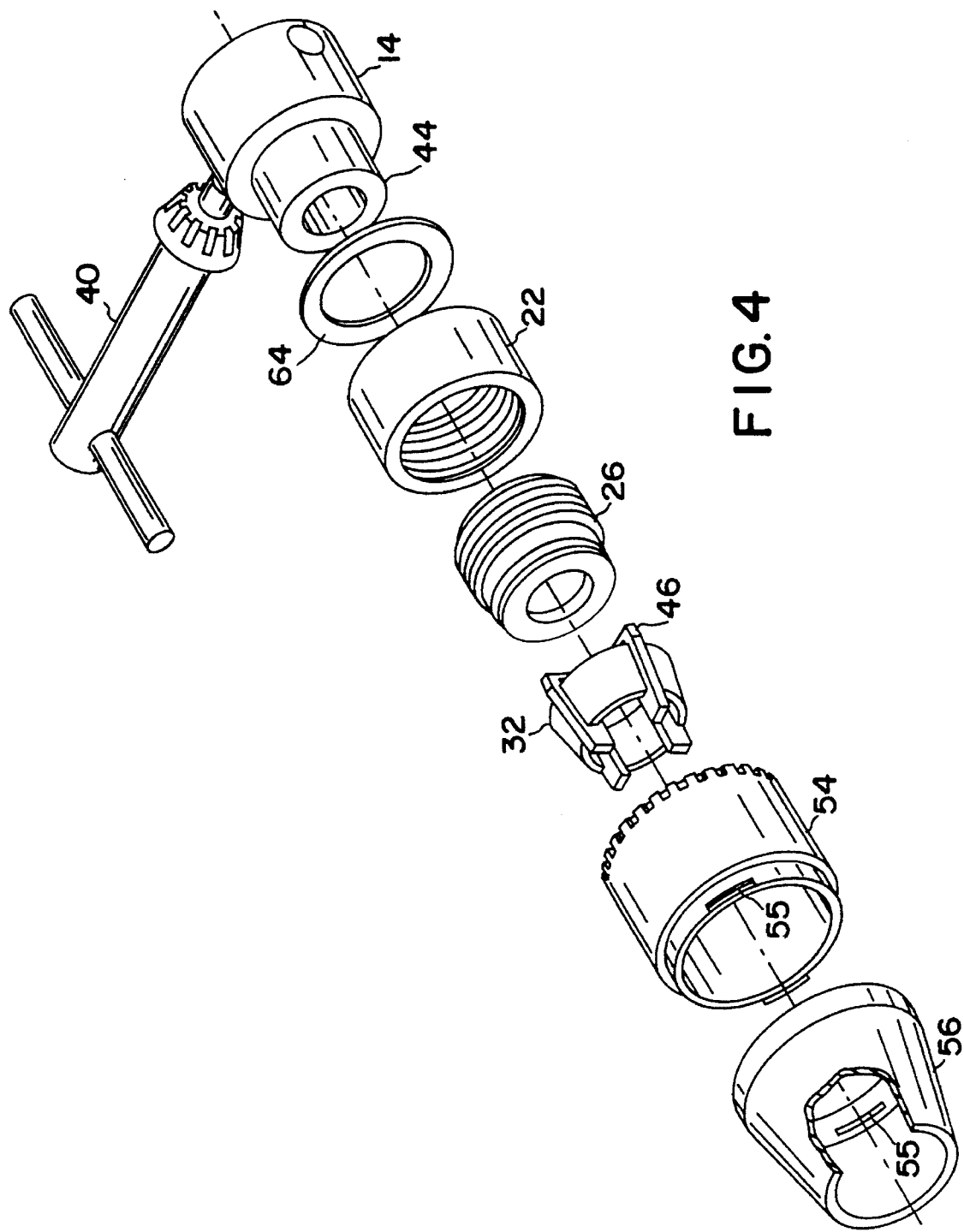
FIG. 4 is an exploded component view of an alternative embodiment of the present invention.

In an alternative embodiment, sleeve member 16 need not necessarily comprise two halves, such as is illustrated in FIG. 4, but may be separable or removable from body member 14 in some other conventional manner so long as access is provided to collet receiving chamber 62.

For operation of device 12, it is necessary to rotate sleeve 16 relative to body 14. For this purpose, in a preferred embodiment sleeve 16 includes teeth 38 defined at the rearward end thereof. This feature is particularly illustrated in FIGS. 2 and 3. Teeth 38 are formed so as to be engaged by driving teeth of a turning device 40. Turning device 40 may include, for example, a conventional chuck key. Preferably, key 40 is of the self ejecting type so that there is no possibility that key 40 remains engaged with sleeve 16 during operation of the driving tool. A recess or hole 42 may be provided in body member 14 for receiving an alignment nipple of key 40. In this manner, it should be readily understood that there is no necessity to lock the drive spindle of the machine in order to tighten the collet device. Tool 40 is merely inserted within recess 42, engaged with teeth 38, and rotated thereby rotating sleeve 16 and driving screw member 26 forward through engagement with nut 22.

Device 12 also preferably includes a bearing disk 64 disposed between nut 22 and a surface of body member 14. In the embodiments illustrated, bearing disk 64 is fitted about stem portion 44 of body member 14. Any conventional bearing surface or device may be utilized as a bearing interface between nut 22 and body member 14.

In the embodiment of the device illustrated, threaded engagement is maintained between nut 22 and screw member 26 even when collet 32 is at its forward most position, within sleeve 16. In this manner, it is impossible for screw member 26 to unthread itself from nut 22. Thus, the integrity of the device is maintained Alternatively, a retaining clip or like device (not illustrated) may be provided between, for example, sleeve 16 and body member 14 to insure that sleeve 16 does not separate from body member 14.

The device 12 according to the invention may be utilized in any manner wherein it is necessary to grip or hold the shank of a tool to a driven spindle. The device is particularly applicable in the router chuck field. However, the invention is not limited to this field. In fact, it will be apparent to those skilled in the art that various modifications and variations can be made in the apparatus of the present invention without departing from the scope or spirit of the invention. For example, the configuration of the nut and sleeve may take on any manner of embodiments. Thus, it is intended that the present invention cover the modifications and variations of this invention provided they come within the scope of the appended claims and their equivalence.

What is claimed is:

1. An integrated collet and chuck device, comprising:

a body member, said body member configured to be non-movably fixed to a drive spindle of a driving tool;

an outer sleeve member disposed concentric about at least a portion of said body member, at least a portion of said sleeve member being rotatable relative to said body member;

a nut configured within said sleeve member so as to be rotatable therewith relative to said body member, said nut comprising an inner diameter engaging surface;

a screw member disposed rotatably concentric within said nut, said screw member comprising an outer diameter engaging surface complementing said nut inner diameter engaging surface, said screw member being movable longitudinally relative to said nut through driving engagement of said nut inner diameter engaging surface and said screw member outer diameter engaging surface, said screw member further comprising a collet engaging surface;

a collet receiving chamber defined axially forward of said screw member and having a frusto-conical inner diameter surface for carrying a machine tool collet;

a collet carried within said collet receiving chamber, said collet comprising a frusto-conical outer diameter surface complementing said collet receiving chamber frusto-conical inner diameter surface, said collet in engaging contact with said collet engaging surface of said screw member so as to move longitudinally therewith relative to said nut; and wherein upon rotation of said sleeve member relative to said body member, said screw member is driven towards said collet receiving chamber progressively forcing said collet frusto-conical outer diameter surface against said collet receiving chamber frusto-conical inner diameter surface causing said collet to clamp about a machine tool shank carried therein.

2. The collet and chuck device as in claim 1, wherein said body member comprises a threaded hole for threaded engagement with a drive spindle of a driving tool.

3. The collet and chuck device as in claim 1, wherein said sleeve member comprises teeth defined therein for engagement with a toothed turning device, said sleeve member being rotated relative to said body member through engaging rotation of the turning device.

4. The collet and chuck device as in claim 3, wherein said body member comprises a recess defined therein substantially perpendicular to the longitudinal axis of said body member, wherein said sleeve member is rotatable relative to said body member through rotation of a turning device removably fitted into said recess about an axis perpendicular to the longitudinal axis of said body member.

5. The collet and chuck device as in claim 1, wherein said nut is formed integral with said sleeve member.

6. The collet and chuck device as in claim 1, wherein said nut is press fitted into said sleeve member.

7. The collet and chuck device as in claim 1, wherein said nut and said sleeve are formed as a single component.

8. The collet and chuck device as in claim 1, wherein said body member comprises a stem portion, said screw member being concentric about said stem portion within said nut.

9. The collet and chuck device as in claim 1, wherein said nut inner diameter engaging surface and said screw member outer diameter engaging surface comprise complementing threaded surfaces.

10. The collet and chuck device as in claim 1, wherein said collet comprises a plurality of individual longitudinally disposed gripping jaws held in a spaced apart relation through a resilient material disposed therebetween, said jaws having an outer face defining said outer diameter frusto-conical surface, and an inner gripping face for clamping upon a machine tool shank carried therethrough.

11. The collet and chuck device as in claim 1, wherein said sleeve member comprises a rearward section and a forward section removably engaged with said rearward section, said rearward section being removable so as to facilitate replacement of or provide access to said collet.

12. The collet and chuck device as in claim 1, wherein said collet is lockingly engaged with said collet engaging surface of said screw member.

13. The collet and chuck device as in claim 12, wherein said screw member collet engaging surface comprises a retaining groove defined therein for engaging with a flange member of said collet.

14. The collet and chuck device as in claim 1, wherein said body member comprises a tapered hole and set screw for engagement with a drive spindle of a driving tool.

15. An integrated collet and chuck device, comprising:

a body member, said body member configured to be non-movably fixed to a drive spindle of a driving tool;

an outer sleeve member disposed concentric about at least a portion of said body member, at least a portion of said sleeve member being rotatable relative to said body member and fixed longitudinally relative to said body member;

a nut non-movably configured within said sleeve member so as to be rotatable therewith relative to said body member, said nut comprising a threaded inner diameter surface;

a screw member comprising an outer diameter threaded surface disposed within said nut, said screw member being movable longitudinally relative to said nut through driving threaded engagement with said nut, said screw member further comprising a collet engaging surface;

a collet receiving chamber disposed forward of said nut, said collet receiving chamber defining a frusto-conical inner surface for engaging with a machine tool collet;

a collet carried within said collet receiving chamber, said collet comprising a frusto-conical outer diameter surface complementing said frusto-conical inner surface of said collet receiving chamber, said collet in engaging contact with said collet engaging surface of said screw member so as to move longitudinally therewith relative to said nut; and wherein upon rotation of said sleeve member relative to said body member, said screw member is driven towards said collet receiving chamber progressively forcing said collet to collapse within said collet receiving chamber and causing said collet to clamp about a machine tool shank carried therein.

16. The collet and chuck device as in claim 15, wherein said collet receiving chamber is defined within a forward section of said sleeve member.

17. The collet and chuck device as in claim 16, wherein said forward section of said sleeve member is removable from said device so as to provide access to said collet.

18. The collet and chuck device as in claim 15, wherein said sleeve member comprises teeth for being engaged by a toothed turning key, wherein said sleeve is rotated relative to said body through operation of the turning key.

19. An integrated collet and chuck device, comprising:

a body member, said body member configured to be non-movably fixed to a drive spindle of a driving tool;

an outer sleeve member disposed concentric about at least a portion of said body member, said sleeve member being rotatable relative to said body member and fixed longitudinally relative to said body member;

a nut configured within said sleeve member so as to be rotatable therewith relative to said body member, said nut comprising a threaded inner diameter surface;

a screw member comprising an outer diameter threaded surface disposed within said nut, said screw member being movable longitudinally relative to said nut through driving threaded engagement with said nut, said screw member further comprising a collet engaging surface;

a collet receiving chamber disposed forward of said nut, said collet receiving chamber defining a frusto-conical inner surface for engaging with a machine tool collet which may be carried therein having a complementing frusto-conical outer surface, said collet receiving chamber being accessible from the outside so that a machine tool collet may be placed therein; and wherein upon rotation of said sleeve member relative to said body member, said screw member is driven towards said collet receiving chamber progressively forcing a collet which may be carried within said collet receiving chamber to collapse within said collet receiving chamber thereby causing the collet to clamp about a machine tool shank carried therein.

20. The collet and chuck device as in claim 19, wherein said collet receiving chamber is defined by said sleeve member, said sleeve member comprising separable parts for providing access to said collet receiving chamber.

21. The collet and chuck device as in claim 19, wherein said collet receiving chamber is formed integral with said outer sleeve member, said outer sleeve member being removably fixed to said body member.

* * * * *